June 22, 1965 S. R. LAMBEIR ETAL 3,191,102

METHOD AND APPARATUS FOR ERASING RECORDINGS ON MAGNETIC TAPE AND FILM

Filed Dec. 14, 1960

United States Patent Office 3,191,102
Patented June 22, 1965

3,191,102

METHOD AND APPARATUS FOR ERASING RECORDINGS ON MAGNETIC TAPE AND FILM

Silvaan René Lambeir, Bonheiden-Malines, and Modest Charline Vereycken, Schelle, Belgium, assignors to Gevaert Photo-Producten N.V., Mortsel, Belgium, a Belgian company Filed Dec. 14, 1960, Ser. No. 75,787
8 Claims. (Cl. 317—157.5)

This invention relates to a method and an apparatus for erasing recordings on magnetic tape or film, and more particularly to a method and an apparatus for erasing such recordings on magnetic tape or film by means of a bulk eraser.

It is generally known to erase recordings on magnetic tape, either by unwinding the whole roll so that the magnetic tape may pass over an erasing head or a permanent magnet, or by moving the spool, according to a special method, in close proximity of a bulk erasing system when the magnetic tape is still wound up.

Many methods are known for erasing recordings on magnetic tape by means of a bulk eraser. According to each of these methods it is essential to provide in each area of the roll of magnetic tape, a demagnetizing field which is continually changing in direction, magnitude and sense. These methods have been described in the German Patent No. 972,166 and the U.S. Patents Nos. 2,826,643, 2,826,642 and 2,481,392. These bulk erasers however show the disadvantage that a sufficient change in direction of the erasing field can only be obtained by a rotating movement of the roll of magnetic tape in respect to the bulk eraser.

It has now been found that said rotation of the roll of magnetic tape over the bulk eraser is no longer necessary if the direction of the erasing field is changed electrically. Hereby the erasing action is very much simplified.

The method according to the present invention can be executed by using a bulk eraser the coils of which are being fed with alternating current, act upon each other by a high mutual inductance whereby random fields are obtained which as a function of time are continuously changing in direction, magnitude and sense, over a sufficiently large area. This mutual interacting of the coils caused by the mutual inductance can be obtained in different ways. For this purpose the coils can either be fed directly by a single or a multiphase alternating current, or the coils can produce their erasing field by an electromotive force induced by a nearby coil.

For example, use can be made of:

A bulk eraser which consists of 4 coils on a single phase power line; 2 of these coils being directly fed and the other 2 coils being fed by inductance. Or otherwise, these 4 coils are connected to a two-phase power line with 2 coils in one phase and 2 coils in the second phase.

A bulk eraser which consists of 8 coils on a two-phase power line, 4 coils being connected by two by two to one phase whilst the other 4 coils are fed by inductance.

A bulk eraser which consists of 6 coils on a three-phase power line, the coils of which are connected in 3 series of 2 coils to each phase. Or otherwise, 2 coils of this bulk eraser are connected to a single phase power line and the other 4 coils are fed by inductance, etc.

The feeding by inductance of a predetermined coil is done by short-circuiting this coil with an appropriate capacitor. Due to the adjacent coil or coils an induction current is originated in said predetermined coil which generates a flux which is out of phase by 90° in respect to the inducing flux. By means of the capacitor the current of the induced circuit is made almost equal to the current of the inducing circuit. The resulting field which is changing again in direction, magnitude and sense, is favorable for the erasure of recordings on magnetic tape or film.

A bulk eraser comprising 6 coils connected to a triphase power line is described hereinafter by way of example, without limiting however the scope of the invention.

Figure 1:
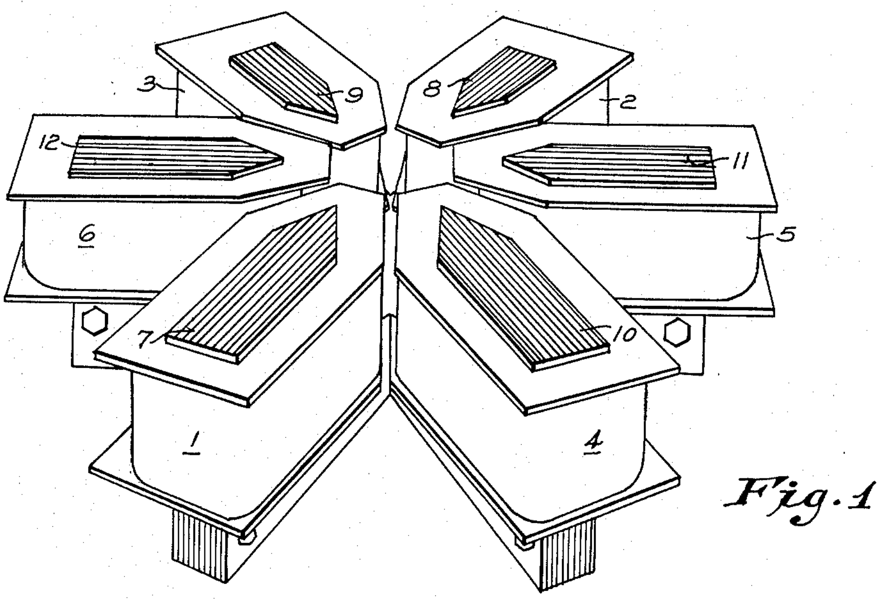
FIG. 1 is a general view of a bulk eraser according to the invention with the arrangement of 6 coils.
Figure 2:
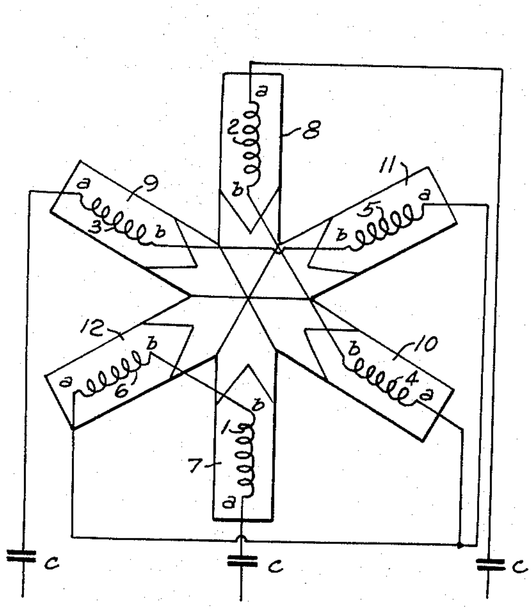
FIG. 2 is a view of the electric circuit of the bulk eraser according to FIG. 1.
Figure 3:
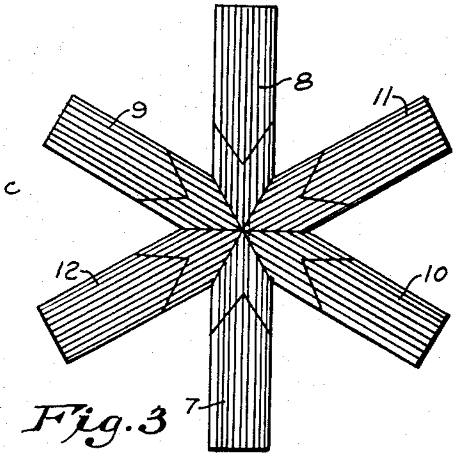
FIG. 3 is a top view of the magnet cores.

As shown in FIGS. 1 and 3 six coils 1, 2, 3, 4, 5 and 6 each provided with an iron core 7, 8, 9, 10, 11 and 12, respectively are star-shape positioned. The cores are composed of laminations with a high initial permeability. The dimensions of the magnetic tape which has to be erased, are defined by the dimensions of the cores. According to the present description of the embodiment, magnetic tapes can be erased on rolls up to 30 cm. in diameter. The self-inductance of each coil is about 0.5 henry. Each time 2 coils are connected in series on each phase. By introducing a capacitor in each of these 3 phases, the total impedance is decreased while also for a defined voltage and coil, the current can be regulated. Two by two, the coils can be connected in different ways. Always, the star-shaped connection is used, whereby only sinusoidal currents can be produced in the circuit, which is quite opposite to the description of the U.S. Patent No. 2,826,642 in which non-sinusoidal currents are essential. Among different connection possibilities the most efficient connection has to be selected i.e. the connection which produces a maximum erasing field at a minimum of current. This most favorable connection is specially shown in FIG. 2. The coils 1–6, 2–4, 3–5, are connected in series and an appropriate capacitor ($C = \pm 10 \mu f.$) increases the phase current up to about 3 amperes on a 220 volt line. For each point of the area of the bulk eraser, the erasing field is continuously changing in magnitude and direction. Between the coils 1–6, 2–3, 4–5, there is mutually a higher inductance than mutually between the other coils. This phenomenon is very favorable for erasing. One simple linear movement of the roll of magnetic tape or film over the bulk eraser suffices for fully erasing the recording tape or film, which means that the erasure damping selectively measured at 1000 c.p.s. is better than 80 db below a signal of 3% harmonic distortion. The noise is lower than the noise of a professional magnetic tape recorder; if the erased tape or film is reproduced at a speed 10 times faster than the normal running speed, there is no signal audibly noticed in the noise spectrum.

An important advantage of the present bulk eraser is shown by the fact that it can be operated with considerably lower currents compared to the presently known erasing devices which require very high currents and which are not able to be maintained in continuous duty operation (journal of the SMPTE, vol. 66, 1957, Bulk Magnetic Film Demagnetizing Practices by L. O. Grignon and A. P. Green, p. 688).

The heat-development of the present bulk eraser is such, that a simple cooling, e.g. air cooling, is by far ufficient to ensure a continuous operation of the erasing device.

Since the speed of the roll of magnetic tape or film which is passed over the bulk eraser amount to about 8 cm./sec., the total demagnetizing time of such a roll is 3 times shorter than the time required for the known types of bulk erasing devices.

Even rolls of magnetic film in metallic boxes are also erased with a simple movement. The so-called spokes as they are mentioned in the Journal of the SMPTE, vol. 66, 1957, p. 688, are not perceptible.

A still further advantage of the present bulk eraser is that a great variety is allowed in the dimensions of the rolls of magnetic tape or film on reels or cores which are to be erased. The maximum dimensions for the rolls according to the embodiment described hereinbefore extends to 30 cm. in diameter and 40 mm. in width. In case of rolls of tape or film having a width between 40 and 80 mm., the erasing can be repeated after the roll has been reversed. By adapting the dimensions and the shape of the parts of the present bulk eraser and by adjusting the current, the maximum dimensions of the tape- or film rolls to be erased can still be increased.

We claim:

1. A bulk eraser for erasing magnetic tape and film comprising electromagnetic coils provided around iron core portions, said coils being electrically connected to act upon each other by a high mutual inductance when supplied by an alternating current source, to produce unordered asymmetric erasing fields.

2. A bulk eraser for erasing magnetic tape and film comprising electromagnetic coils provided around iron core portions, said coils being electrically connected to act upon each other by a high mutual inductance when supplied by an alternating current source to produce random erasing fields.

3. Apparatus for bulk erasing magnetic tape and film, comprising a plurality of pairs of iron cores having a respective leg of each radiating in a common plane from a central point at which corresponding ends of said legs are in magnetic contact to establish a high mutual inductance therebetween; each core having a second leg upstanding from said common plane; a coil wound on each of said second legs, the coils of respective pairs being asymmetrically interconnected with one another and to a source of alternating current, to produce a resultant unordered, asymmetric erasing field.

4. Apparatus in accordance with claim 3, and capacitor means connected with said coils for decreasing the total impedance of said apparatus.

5. Apparatus in accordance with claim 4, in which said pairs of coils are asymmetrically star-connected with one another.

6. Apparatus for bulk erasing magnetic tape and film, comprising a plurality of iron cores having corresponding ends of each in close mutual magnetic coupling relationship to one another, a coil wound on each of said cores, and means asymmetrically interconnecting said coils with one another and to a source of alternating current, to produce an unordered, asymmetric erasing field.

7. The method of bulk-erasing magnetic tape and film, comprising generating an unordered, asymmetric magnetic field which is continuously changing in direction, magnitude and sense as a function of time, and moving said tape or film with a purely linear movement through said magnetic field.

8. The method of bulk-erasing magnetic tape and film, comprising generating an unordered, asymmetric magnetic field which is continuously changing in direction, magnitude and sense as a function of time, and moving said tape or film successively through said magnetic field, in reversed orientations, and with purely linear movements thereof.

References Cited by the Examiner

UNITED STATES PATENTS 2,895,016 7/59 Moore ---------------- 317—157.5

SAMUEL BERNSTEIN, *Primary Examiner.*